(12) United States Patent
Gilday et al.

(10) Patent No.: US 6,871,183 B2
(45) Date of Patent: Mar. 22, 2005

(54) SYSTEM AND METHOD OF PREPARING AND PROCESSING DATA FOR TRADE PROMOTION

(75) Inventors: Scott R. Gilday, Chicago, IL (US); Vic Orler, Hinsdale, IL (US); Alex Zaks, Chicago, IL (US); Jie Liu, Chicago, IL (US); Gary E. Singer, Chicago, IL (US)

(73) Assignee: Accenture, Chicago, IL (US)

( * ) Notice: Subject to any disclaimer, the term of this patent is extended or adjusted under 35 U.S.C. 154(b) by 272 days.

(21) Appl. No.: 09/768,144

(22) Filed: Jan. 24, 2001

(65) Prior Publication Data

US 2002/0198759 A1 Dec. 26, 2002

(51) Int. Cl.[7] .................................................. G06F 17/60
(52) U.S. Cl. ............................ 705/10; 705/28; 705/14
(58) Field of Search ............................... 705/1, 7, 8, 10, 705/14, 28

(56) References Cited

U.S. PATENT DOCUMENTS

| | | | |
|---|---|---|---|
| 5,960,407 A | | 9/1999 | Vivona |
| 5,999,908 A | * | 12/1999 | Abelow .......................... 705/1 |
| 6,006,197 A | * | 12/1999 | d'Eon et al. ................... 705/10 |
| 6,029,139 A | * | 2/2000 | Cunningham et al. ......... 705/10 |
| 6,151,582 A | * | 11/2000 | Huang et al. ................... 705/8 |
| 6,307,958 B1 | | 10/2001 | Deaton et al. |

FOREIGN PATENT DOCUMENTS

| | | | |
|---|---|---|---|
| JP | 09204152 | * | 12/1992 |
| WO | WO 9715023 A2 | * | 4/1997 |

OTHER PUBLICATIONS

Thomas et al "The real cost of trade promotion", Jan. 1987, Progressive Grocer, v66, p16(2), dialog file 148, Accession No. 03117217.*

International Search Report mailed on Jan. 30, 2004, for PCT/US02/01835 filed on Jan. 24, 2002, 4 pgs.

* cited by examiner

Primary Examiner—Romain Jeanty
(74) Attorney, Agent, or Firm—Banner & Witcoff, Ltd.

(57) ABSTRACT

A system and method for the preparation of data into an organized and effective methodology provides users with a data modeling tool. Data is confirmed and baseline calculations, event extraction, key performance indicator calculations and the production of event outputs are performed. Analytical tools can then be used to visualize patterns, trends and relationships in the data.

37 Claims, 12 Drawing Sheets

SYSTEM AND METHOD OF PREPARING AND PROCESSING DATA FOR TRADE PROMOTION

TECHNICAL FIELD OF THE INVENTION

The present invention relates to a system and method for the preparation of data, and in particular, to a system and method of data modeling and processing for a trade promotion-effectiveness analysis.

BACKGROUND OF THE INVENTION

Recent studies on trade promotion spending effectiveness in the consumer products industry have indicated that consumer products companies spend more than $25 Billion on trade promotion and much of this spending is very inefficient. This inefficiency is due to manufacturers' lack of promotion strategy, purpose, and objectives; their poor visibility into post-event performance; their inadequate processes, systems, and data; and the fact that they often misunderstand the true costs of promotion.

Accordingly, a need exists for a system to guide a manufacturer's decisions related to trade promotion.

SUMMARY OF THE INVENTION

In one embodiment of the invention, there is a method of processing data. The method includes, for example, collecting and transforming consumption data, shipment data and event cost data, and aggregating the consumption data, shipment data and event cost data into a single data file.

In one aspect of the invention, the method further includes, for example, verifying account and product hierarchies in the consumption data to ensure unique account identifiers and product identity and characteristics, respectively, and recording the consumption data such that for the account, a UPC (Uniform Product Code) exists for an observation, and such that observation characteristics are recorded uniformly.

In another aspect of the invention, the method further includes, for example, rolling the consumption data into a sales summary report for viewing by a user.

In still another aspect of the invention, the sales summary report includes aggregated sales by account, by promoted product groups and by account/promoted group combinations.

In yet another aspect of the invention, the method further includes, for example, mapping the shipment data in order to match shipment accounts to syndicated data, and to match shipment SKUs (Stock Keeping Units) to promoted groups, and checking the shipment data to verify account, product and week level uniqueness.

In still another aspect of the invention, the method further includes, for example, verifying the uniqueness of the account, promoted group, start week and duration level of the event cost data, and removing events with inconsistent information.

In another embodiment of the invention, there is a method of aggregating data to create a data file for analysis. The method includes, for example, inputting consumption data, shipment data and event cost data, matching accounts and products for the consumption, shipment and event cost data, and outputting the data file based on the matching.

In one aspect of the invention, the method further includes, for example, monitoring the below-baseline performance of the data for promoted product category sales during a specified period following an event, monitoring the below-baseline performance of the data for non-promoted products within the promoted products during the event, and allocating the shipment data.

In still another embodiment of the invention, there is a system for processing data. The system includes, for example, a database collecting consumption data, shipment data and event cost data, and a processor transforming and aggregating the consumption data, shipment data and event cost data into a single data file.

In yet another embodiment of the invention, there is a system for aggregating data to create a data file for analysis. The system includes, for example, a database storing consumption data, shipment data and event cost data, and a processor matching accounts and products for the consumption, shipment and event cost data, and outputting the data file based on the matching.

DETAILED DESCRIPTION OF THE INVENTION

This invention provides a Sales and Marketing Analytical Redeployment Tool (SMART) that helps companies address their critical trade promotion issues and drive growth. This tool helps manufacturers redeploy their trade promotion investments by identifying the least and most productive promotion spends, thus allowing users to quickly redeploy funds to drive improvements in both top- and bottom-line performance.

In particular, the present invention relates to a system and method for the preparation of data into an organized and effective methodology and provides users with a data modeling tool for the same. In this regard, the invention seeks to provide an approach for conducting data modeling and processing for a trade promotion effectiveness analysis. Generally speaking, the system and method of the present invention perform data confirmation and transaction, baseline calculations, event extraction, key performance indicator calculations and the production of event-level score cards, as more fully described below. The system and method also informs users of the prerequisites necessary to perform each process and the exit criteria that should be met in order to move to the next process.

The primary value "destroyers" for manufacturers today are trade promotion inefficiencies. Trade promotion strategies are often unclear and even unsound if they exist at all. Trade promotion effectiveness is frequently exaggerated, as hidden costs are underestimated and benefits are over-stated. The present invention, or Sales and Marketing Analytical Redeployment Tool ("SMART"), encapsulates the processes and tools necessary for the execution of trade promotion analysis. The SMART model consolidates three major types of information: consumption, shipments and event cost. Consumption information is typically extracted from the clients' IRI or AC Nielsen provided database. Shipment data is obtained from the clients' internal systems, and event spending is collected from the clients' sales organization. This information is then used to construct a database of trade events uniformly measured by a set of potential "causal" variables and key performance indicators (KPIs). The event database is then analyzed, as described below, to produce the primary drivers of event effectiveness (or ineffectiveness).

The SMART model also provides the means to perform post-event analysis. KPIs can be calculated for each event within the model (e.g. spending efficiency, forward buying, retailer pass-through, etc.). Additionally, consumption baselines, pantry loading and cannibalization can be calculated with the present invention. Analysis tools are also included to visualize patterns, trends and relationships in the data, and an analytical process exists to guide the users through the analysis. Data mining techniques can also be applied to automatically search multiple dimensions for complex or non-intuitive hypotheses.

Promotion Value Targeting

Figure 1:
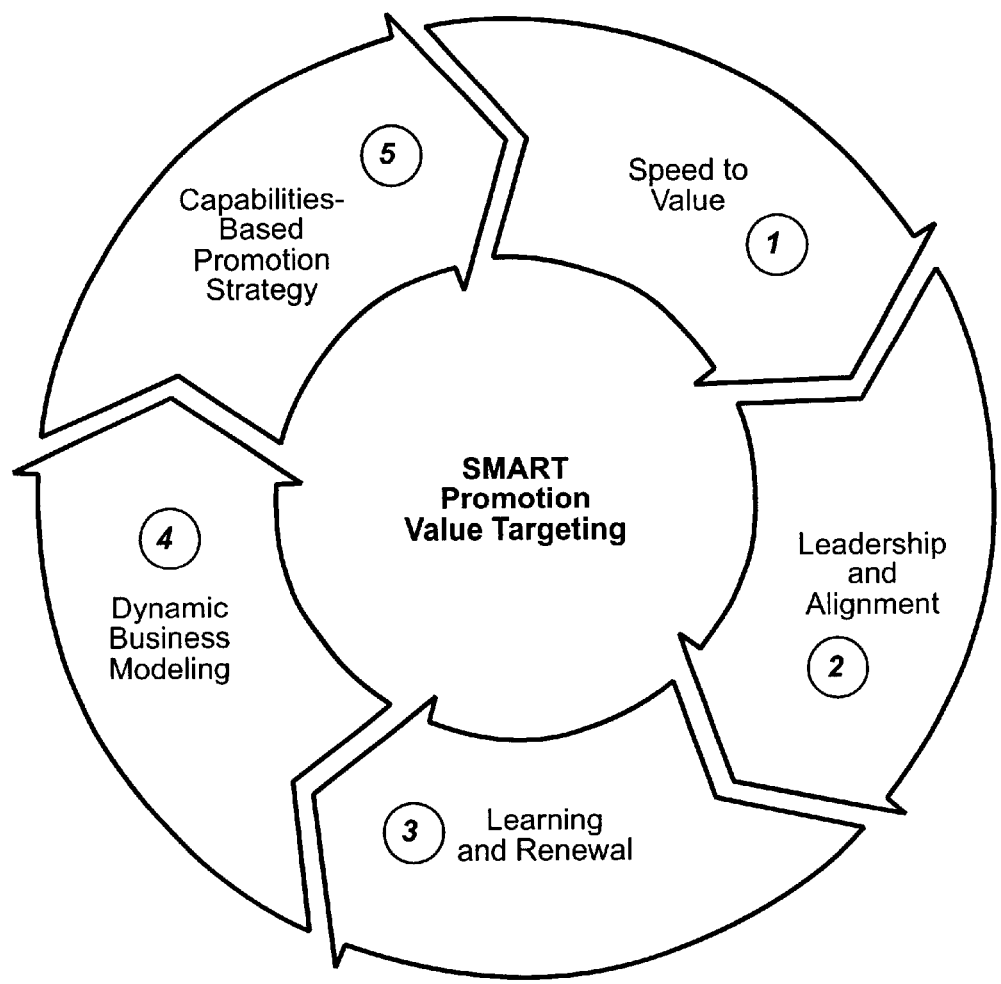
FIG. 1 illustrates one embodiment of the invention for promotion value targeting.

FIG. 1 illustrates one embodiment of the invention for promotion value targeting. Promotion value targeting is based on closely working with a focused team to conduct fact finding, identify value opportunities, drive consensus on value piloting and build an execution plan. First is "speed to value". Speed to value allows users to leverage their best practice databases using the system and method of the present invention, and to identify "quick win" opportunities and benefits. After the completion of the speed to value portion, leadership and alignment beings. This portion of the process brings management together for prioritization/consensus sessions, and contemplates the "quick win"/pilots. Learning and renewal tracks the pilot results and develops broad-scale implementation alternatives, as well as utilizes the pilots to demonstrate success and build the organization. Dynamic business modeling then develops business case scenarios (e.g. the size of the opportunity) and explains the trade-offs among the implementation alternatives. Finally, the capabilities-based promotion strategy prioritizes gaps and opportunities and implements value-based programs (e.g. fund structures/strategy, processes/policies, systems and tools, performance drivers, etc.).

Figure 2:
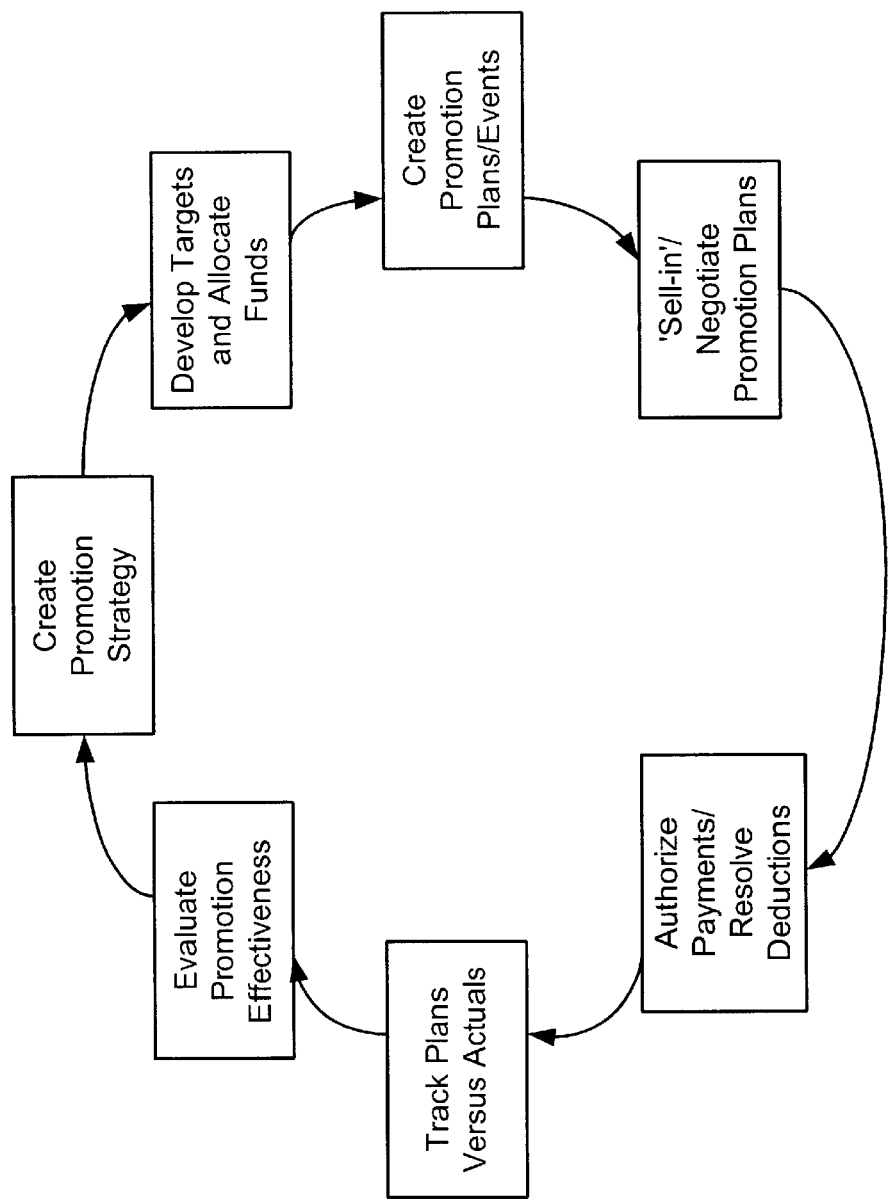
FIG. 2 illustrates an exemplary integrated, close-loop process for a promotion strategy.

FIG. 2 illustrates an exemplary integrated, close-loop process for a promotion strategy. Initially, a promotion strategy is created by (a) defining the role of trade promotion based on category goals, (b) developing trade promotion goals/objectives and success metrics, and (c) developing and publishing national trade promotion program and guidelines, policies and tips for trade promotion. Then, targets are developed and funds allocated. This is accomplished by (a) defining specific volume, profit and business objectives, (b) determining spending needs at the category/account level and roll-up to a high-level promotion budget, and (c) establishing a spend rate for each case/lb. shipped and by deploying additional merchandising funds to regional manager for equitable and fair distribution, as needed. Promotion plans/events are then created by (a) using customer/event learning to conduct "what if" simulation, (b) developing promotion plans by category and account, and (c) documenting, approving and changing plans/targets if necessary. Subsequently, 'sell-in'/negotiate promotion plans are formed. This is accomplished by (a) preparing for customers questions and objections, (b) capturing commitments at the customer/event level, (c) discussing payment strategies/options with customers, and (d) setting up plans in order entry/invoicing systems. Next, payments/deductions resolutions are authorized by (a) reviewing and verifying event performance vs. commitments and authorizing payments to customers, (b) receiving open deductions from accounts receivable and matching them to promotion commitments, and (c) clearing "matched" deductions in accounts receivable and sending payment authorizations to accounts payable. Plans are tracked versus actuals and then accounted for. This occurs by (a) tracking shipments and consumption, revenue, promotion spending and profitability against the plan, (b) conducting store checks/monitoring retail activities, (c) revising plans to meet new customer and business demands, as necessary, and (d) reviewing and monitoring trade accruals and capturing customer/event learnings. Finally, promotion effectiveness is evaluated. Evaluation occurs by (a) gathering trade promotion results and evaluating promotion effectiveness, (b) reviewing performance metrics and determining root causes of under- and over-performance, (c) documenting and sharing learnings, and (d) reviewing language with customers and identifying impact on future plans.

Data Modeling and Transformation

Figure 3:
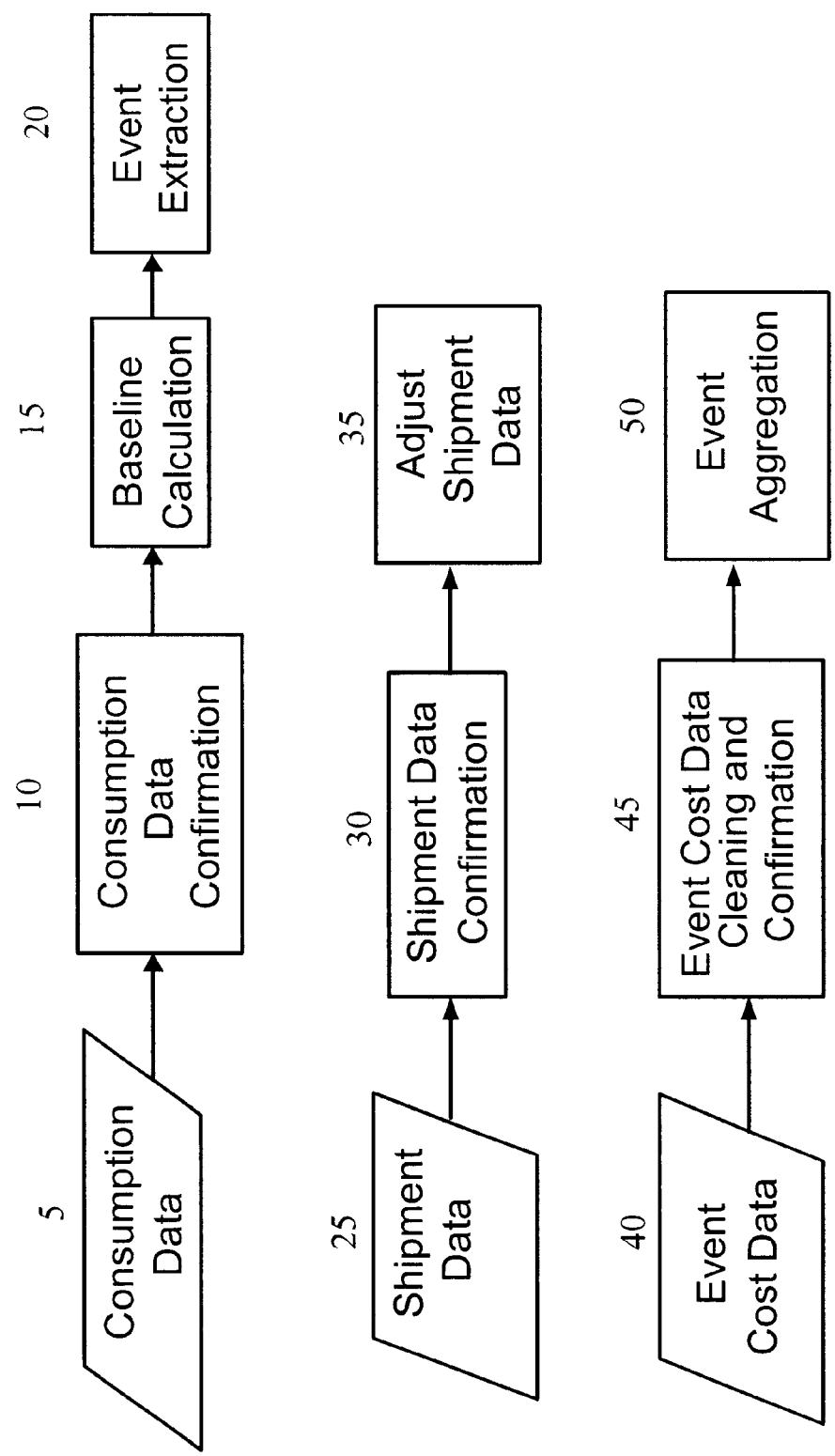
FIG. 3 illustrates an exemplary embodiment of a process in the present invention.

FIG. 3 illustrates an exemplary embodiment of a process in the present invention. In the preferred embodiment, there are three categories of data used to construct a historical event file—each having a process for data preparation and verification. These three categories of data include, but are not limited to, consumption data, shipment data and event cost data. Generally speaking, consumption data includes information about accounts, products, sales and promotion activity (e.g., ad, display, etc.); shipment data includes information about when, how much and at what price a product was sent to a retailer; and event cost data includes event spending information. Of course, other sources of data (e.g., media and consumer activity, demographic information, etc.) may also be used.

The present invention includes the following processes that are involved in the transformation of consumption, shipment and event cost data into an output file (i.e. historical event file). More specifically, the transformation of data includes consumption data process 5, shipment data process 25 and event cost data process 40. Consumption data process 5 includes consumption data confirmation 10, baseline calculation 15 and event extraction 20. Shipment data process 25 includes shipment data confirmation and adjust shipment data 35. Event cost data process 40 includes event cost data cleansing and confirmation 45 and event aggregation 50. In the preferred embodiment, these processes are independent from one another and may be executed individually or in parallel. In the consumption data transformation process 5, weekly "UPC" ("Uniform Product Code" or individual item) level consumption data is first cleansed and verified, as described below. Baselines may need to be recalculated to accurately reflect incremental volume. Events can be extracted based upon merchandising activity. For shipment data preprocessing 25, the data is first cleansed, verified and mapped to accounts and promoted product groups for later merging with the consumption data. The event cost data process 40 provides a consistent record of event spending, which may require some standardization of pricing strategies and cost reporting. Ultimately, data elements are aggregated into a single table of events to be used in the overall analysis. A more detailed discussion of each process is described below.

Figure 3A:
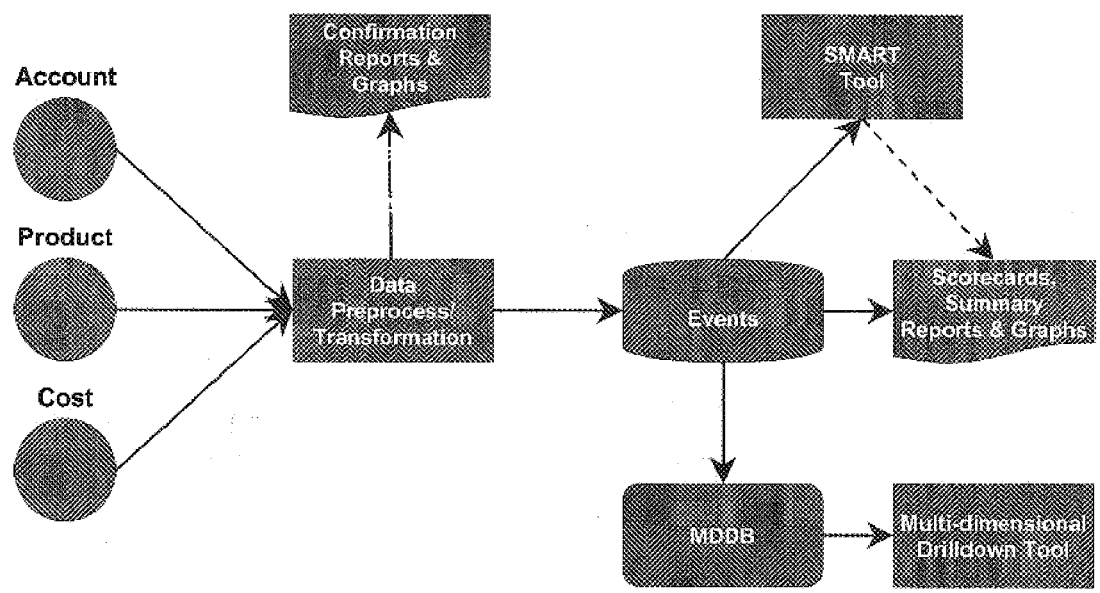
FIG. 3A illustrates an exemplary system for the present invention.

FIG. 3A illustrates an exemplary system for the present invention. The system includes, for example, account, product and cost data; data preprocess/transformation storage, which can store confirmation reports and graphs; a database for storing data sets, including events and which outputs scorecards, summary reports and graphs; a SMART tool (e.g. an interface that allows a user to execute the various tools implemented by the system); and a MDDB (multi-dimensional database), which outputs a multi-dimensional drilldown tool.

Figure 3B:
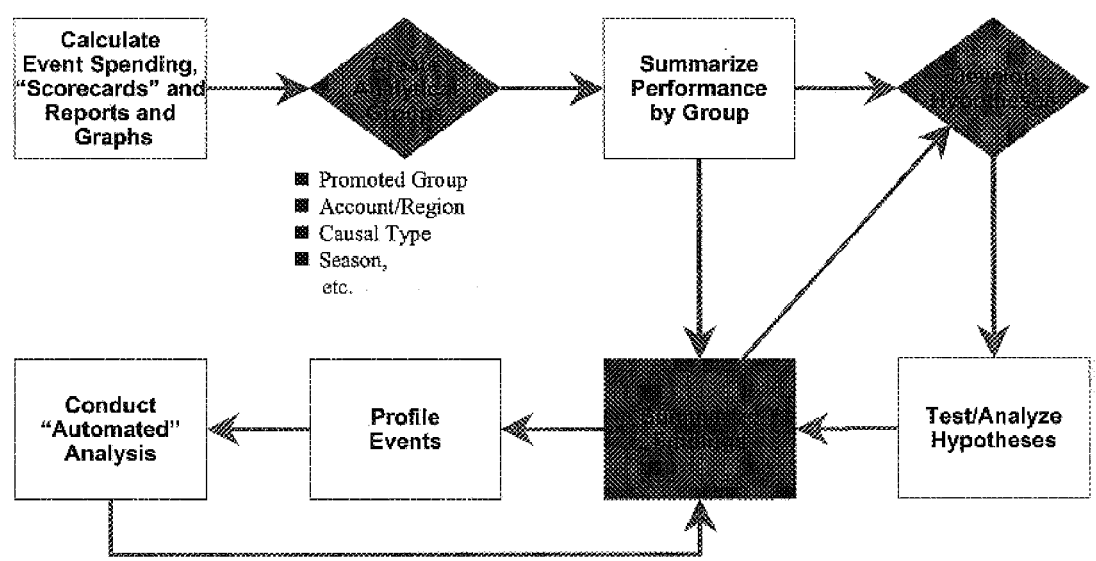
FIG. 3B is an exemplary flow diagram of the analysis approach of the present invention.

FIG. 3B is an exemplary flow diagram of the analysis approach of the present invention. The analysis approach includes, for example, calculating event spending, scorecards and reports and graphs; creating analytical groups; summarizing performance by group; developing hypotheses; testing/analyzing hypotheses; summarizing findings; profiling events; and conducting automated analysis. This is more fully described below.

Consumption Data

Figure 4:
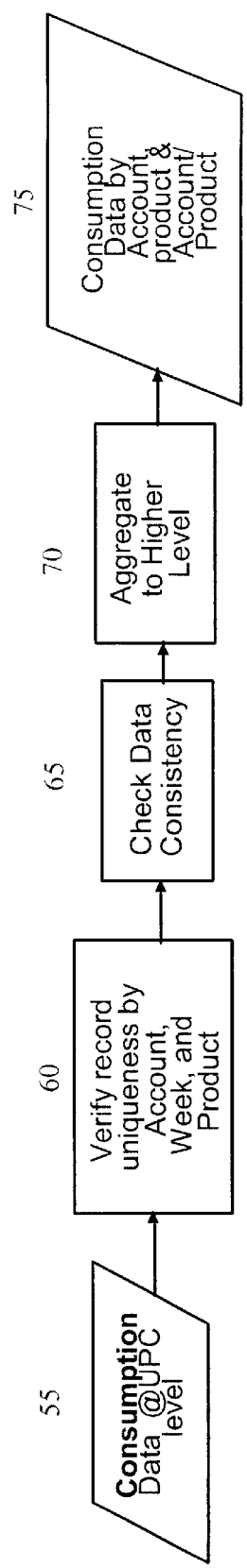
FIG. 4 illustrates an exemplary flow diagram of the consumption data confirmation process.

FIG. 4 illustrates an exemplary flow diagram of the consumption data confirmation process. The consumption data confirmation process 10 includes, for example, inputting consumption data at the UPC-level 55; verifying record uniqueness by account, week and product 60; checking data consistency 65; aggregating the data to a higher level 70 and outputting consumption data by account, product and account/product 75. Consumption data confirmation processing 10 confirms the input data, performs accurate baseline estimation and extracts events. As depicted in FIG. 4, the main input of the consumption data processing (at 55) is weekly UPC-level sales and merchandising information from a syndicated data provider such as IRI or AC Nielsen. The main output of consumption data processing (at 75), on the other hand, is a "clean" set of promoted product group sales and merchandizing characteristics for events. "Clean" in the context of this consumption data processing refers to the verification, checking and aggregation of data in process 10.

Consumption data confirmation process 10 involves verification of account and product hierarchies, observation uniqueness and measurement consistency. A "source consumption data set", i.e., a set of consumption data received from multiple syndicates, or syndicated consumer data, is input into the consumption data confirmation process 10, and results in a "data confirmation report" which allows the integrity of the data to be confirmed. The account hierarchy includes unique account identifiers such as account names or account IDs. Each account will have attributes such as geographic region, pricing policy (e.g. EDLP), etc. Similarly, the product hierarchy can uniquely identify each product and its characteristics (UPC, category, brand, promoted group, etc.) (e.g., "Six pack of XYZ 12 oz light beer cans" UPC, "light beer" category, "XYZ" brand, and "Premium Beer" promoted group). The correct establishment of these hierarchies ensures that other data sources will merge properly with each other. Observation uniqueness means that within a given account, each UPC should exist in one observation per week. If records are missing for certain weeks, they should be replaced with zero or null observations. If duplicates exist, they are purged in the preferred embodiment. Measurement consistency, on the other hand, means that observation characteristics should be recorded uniformly. For example, ratios should not sometimes be recorded in decimal form and sometimes as percentages.

Upon completion of the consumption data confirmation process 10, the data may then be used to create a sales summary report for final client confirmation. The data will be used to create a report that will show, for example, aggregated sales by accounts, by products and by account/product combinations. The report, including the aggregated data, should be more familiar to the client than detailed UPC level time series data and allow the client to verify the accuracy and magnitudes of the aggregated sales values more easily.

The consumption data confirmation process 10 performs the following:

Calculates a total sales summary by account—This summary can be viewed online or exported to a file for further formatting.

Calculates a total sales summary by promoted group—This summary can be viewed online or exported to a file for further formatting.

Calculates a total sales summary by account/promoted group—This summary can be viewed online or exported to a file for further formatting.

Calculates a base sales time series by account/promoted group—This summary will be extracted for use in, for example, the Excel Time Series Tool.

Prior to performing the consumption data confirmation process 10, various data is collected, such as consumption IRI data such as account, product, % ACV, dollar sales, base sales, unit sales, dates, etc.; account data such as account, account type, customer, region, etc.; and product data such as product, promoted group, category, brand, division, etc. % ACV, or percent all commodity volume, refers to the weighted percentage of sales volume sold under a trade promotion event at a given retail account within a given market.

The data should meet the following requirements and should be checked for uniqueness, completeness, and consistency:

Records should be unique by account, product, and week.

Product and account names should match the IRI names.

IRI % ACV values should be consistent, i.e., either all should be expressed as a whole number or a decimal number, and should be between 0% and 100%.

IRI week dates should be consistent, i.e., week ending dates should be on a Sunday, and the weeks that are to be included in the analysis should be included.

Users should review and confirm summary data.

Baseline Calculation

Figure 5:
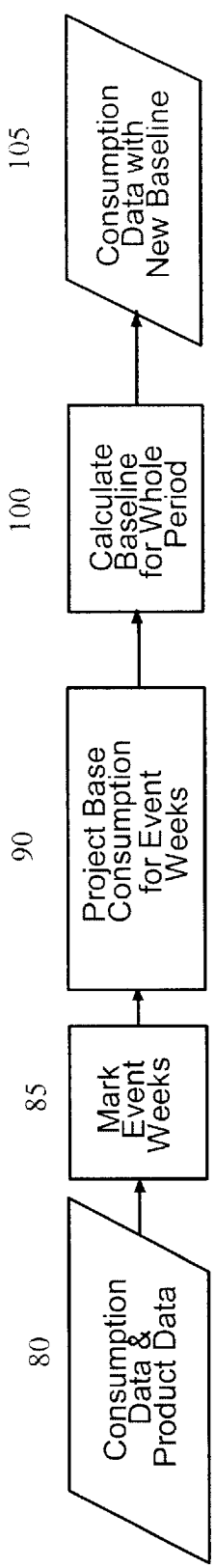
FIG. 5 is an exemplary flow diagram of the baseline calculation.

After completion of the consumption data confirmation process 10, a baseline calculation 15 is made. FIG. 5 is an exemplary flow diagram of the baseline calculation. The baseline calculation 15 accepts the verified consumption data set (and product data) 80 as an input, and outputs a consumption data set with a new baseline at 105. The baseline calculation ensures the accurate calculation of incremental volume. If suitable baselines are not provided in the syndicated data (i.e. IRI or AC Neilson data), the baselines are estimated within the model. Consumption and product data 80 are input into the baseline calculation 15, and the event weeks are marked at 85 at the product level for the non-competitor data. Once the event weeks are marked at 85, the base consumption for the event weeks is projected. The projected base consumption is then used to calculate the baseline for the whole period at 100, and consumption data with a new baseline is output at 105.

The present invention provides the capability to estimate the actual baseline volume for each UPC time series using the consumption levels reported in the syndicated data. Actual promoted sales observations in the syndicated data are replaced with the non-promoted mean sales for each UPC to eliminate the effects of the promotion. A new baseline is then forecast from the adjusted time series using an exponential smoothing technique, and spikes in the new baseline are removed with a 5 week moving average (of course, this number can be varied), in the preferred embodiment. This technique is especially well-suited for products that have week or no seasonality. For more seasonal products, further adjustments can be made to smooth out the effects of seasonality.

The baseline calculation process performs the following:

Select non-competitor data at account, product, and week level from master 1 data.

Mark the event weeks at the product level for the non-competitor data.

Calculate the consumption baseline using exponential smoothing for the marked event weeks.

Prerequisites to performing the above process include, for example, a master data set 1—with hierarchy and a data set which includes the consumption data with the account, product and time hierarchy. Prerequisites for the master data set 1 include, for example, consumption IRI data such as account, product, % ACV, dollar sales, base sales, unit sales, dates, etc.; account data such as account, account type, customer, region, etc.; product data such as product, promoted group, category, brand, division, etc.; and time data such as season, season/year, week, etc.

Records should be unique by account, promoted group, week, and new baseline sales (sales without any promotions) and incremental sales are recalculated using exponential smoothing. Upon the completion of the newly calculated baseline, a second master data set is created. This set (master data set 2) includes the master data set 1 and the newly calculated consumption baseline data.

Event Extraction

Figure 6:
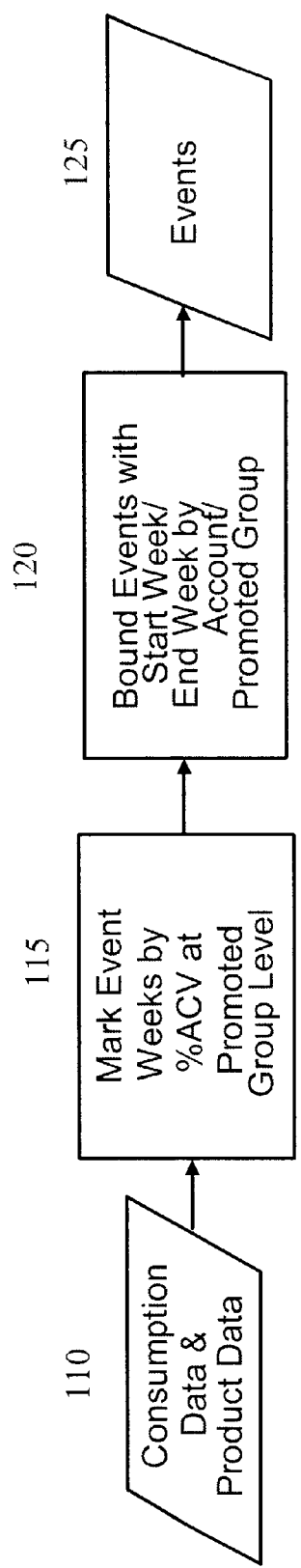
FIG. 6 is an exemplary flow diagram of an event extraction.

Event extraction 20 occurs after the consumption data has been checked and verified. Event extraction 20 is independent of the baseline calculation 15. FIG. 6 is an exemplary flow diagram of an event extraction. Generally speaking, the process identifies and marks event weeks by % ACV at the promoted group level, and then assigns event Ids to the marked weeks and generates an all events data set. Specifically, consumption and product data are input at 110, and event weeks are marked according to % ACV at the promoted group level at 115. The marked events are then bound with the start week/end week by account/promoted group at 120, and events are output as a consumption data set aggregated to the event level at 125.

Promotion events are extracted (or identified) in the syndicated data based upon the presence of merchandising activity (also referred to as causal activity), unless accurate event calendars are provided. Where this activity is detected, an event is identified. Incremental volume is not used to identify events, and therefore does factor into the baseline calculation. Typically, several types of merchandising activity are reported in the syndicated data with some indication of their level of intensity. For example, IRI uses four mutually exclusive types: Feature Only, Display Only, TPR Only and Feature and Display. The intensity level is measured as a percentage of the stores' ACV in the account under which this activity occurred. Activity intensity thresholds are used to detect when a promotion was run (e.g. 40% ACV Feature Only) and each observation that meets or exceeds the specified thresholds is flagged as an event week (115).

Event extraction performs the following process:

Sales (total consumption) are grouped by account/promoted group.

UPC-level data is rolled-up to the promoted group level.

Event weeks are marked in the account/promoted group data.

Event IDs are assigned to marked weeks.

n event table is generated outlining all the extracted events.

Additionally, during event extraction the following processing occurs:

Thresholds set for causal activity allow the event extraction process to identify and mark those promoted groups and weeks where event activity occurred (e.g., If % ACV>40%, a promotion event is marked).

Data for the promoted groups is aggregated with event activity for the promotion event. The causal activity is averaged and all other numeric variables are summed-up for the duration of the event.

These events, which are defined by account, promoted group, start week, and duration, are then assigned unique identifiers.

Numeric variables are summed-up over time, and an average, minimum and maximum % ACV for the promotion types is calculated. Event extraction is also used to match the event calendar from the division to the data from the event extraction process before the data is rolled-up to the event level and shipments are allocated. Also, cannibalization and pantry loading are taken into account, as described below.

Shipment Data Processing

Figure 7:
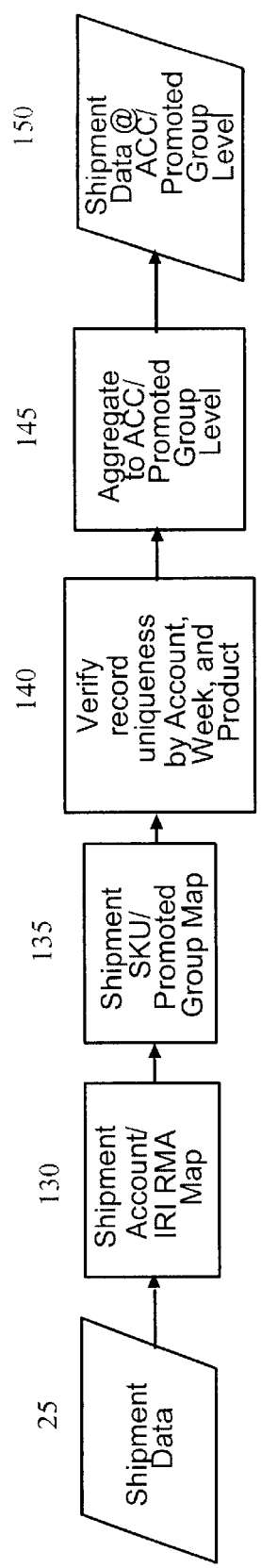
FIG. 7 is an exemplary flow diagram of shipment data processing.

FIG. 7 is an exemplary flow diagram of shipment data processing. Shipment data 25, which is obtained from users' internal systems, and is mapped in order to match the shipment accounts to the IRI accounts and the shipment SKUs to the promoted groups at 130 and 135. The data is then checked for uniqueness at the account, product (UPC), week level (140) and then rolled up to the account, promoted group and week level for further processing at 145 and 150.

More specifically, shipment data confirmation 30 includes the following process:

Map shipment accounts to IRI account-RMA. "Mapping" involves linking internal company shipment information to the syndicated consumption data.

Map shipment SKU to promoted groups.

Roll shipment data to account, promoted group, and week level.

Merge shipment data with calendar data to obtain season information.

Calculate average of cost of goods sold (COGS) and list price to retailer by promoted group.

Impute COGS and list price to their respective promoted groups.

Calculate total shipments by account, promoted group.

Match the consumption volume to the shipments and calculate the shipment conversion factor (for differences in size between the company and syndicated shipment regions). This factor equals the amount of consumption divided by the amount shipped.

Adjust shipment data with conversion factor.

Prerequisites to performing the above process include, for example:

Shipment Data: shipment account, shipment products name, number of units shipped or returned by week, week dates, COGS, etc.

Shipment Account Map: shipment account, and account-RMA.

Shipment Product Map: shipment product name and promoted group.

Time Data: season, season/year, week, etc.

The resultant data should meet the following requirements and should be checked for uniqueness, completeness, and consistency:

Shipments should be unique by account, product, and week.

Shipments should be aggregated to account, promoted group, and week level for merging with the events Shipments should be in terms of the same units (i.e., cases, pounds) as the rest of the data.

Ship week dates should match the time data week dates.

Upon completion of this process, a master data set 3 is calculated. Master data set 3 includes the master 2 data matched to the shipment data. Prerequisites to the creation of the master data set 3 include master data set 2 and the adjusted shipment data, as described below. Also created is master data set 4. Master data set 4 includes master data set 3 data, competitor market data (e.g. account, promoted group and competitive market), consumer activity (e.g. account, promoted group, week and consumer activity), media activity (e.g. account, promoted group, week and media activity), substitutable group data (promoted group, substitutable group and region) and calendar data (e.g. season, month position, special days and week).

Competitive activities may then be extracted from the consumption data and rolled-up to the account/category level. The competitor event weeks are then marked with product % ACV causal. In order to accomplish this, certain data is required including, for example, the master data set 1—with hierarchy and the competitive activity data, such as account, category, % ACV, week, and equivalized unit sales. The data that is output should be checked for uniqueness, completeness, and consistency. That is, records should be unique by account, category, and week.

Subsequently, master data set 5 is created by incorporating the master 4 data and competitor event data. The newly formed set of data should meet the following requirements and should be checked for uniqueness, completeness, and consistency: records should be unique by account, product, and week, and additional records should not be created as a result of the merge of data.

Figure 8:
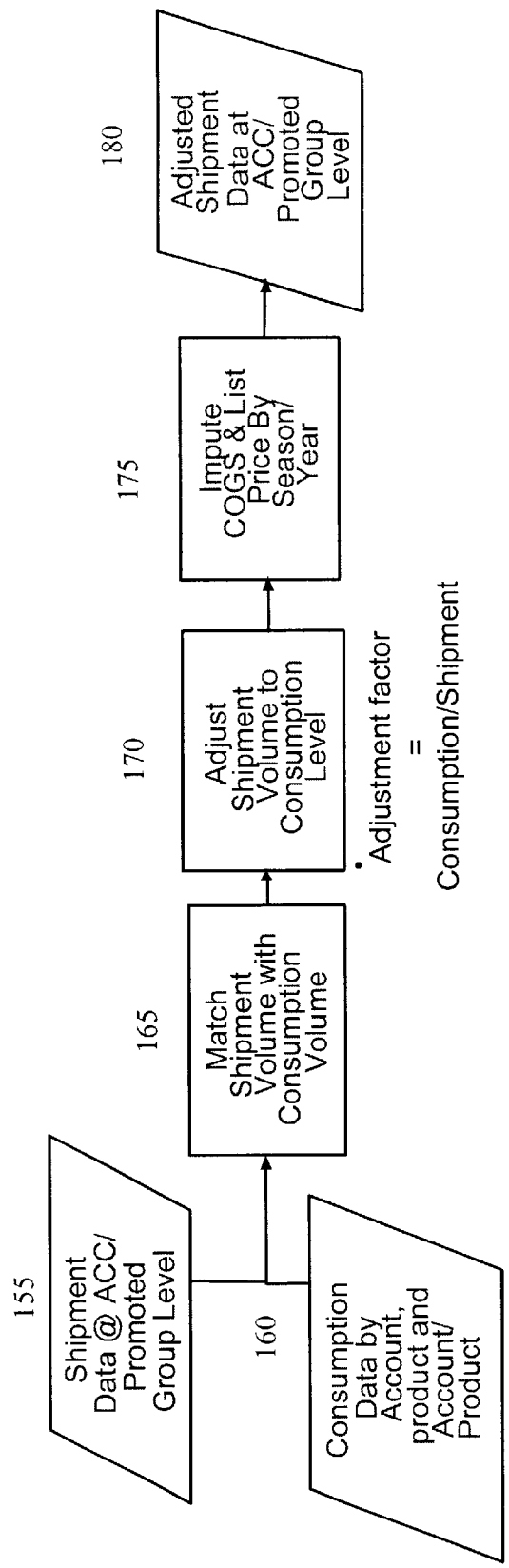
FIG. 8 is an exemplary flow diagram of adjusting shipment data.

FIG. 8 is an exemplary flow diagram of adjusting shipment data. Shipment data is adjusted at 35. Initially, the shipment volume (155) is matched to the consumption volume (160) at 165 in order to calculate the conversion (i.e. adjustment) factor (adjustment factor=consumption/shipment) needed to adjust the shipment volume to the consumption level (170). Then the cost of goods sold (COGS) and list price by season/year combination are imputed (175). This calculation results in the adjusted shipment data at the Account/Promoted Group Level (185).

Figure 9:
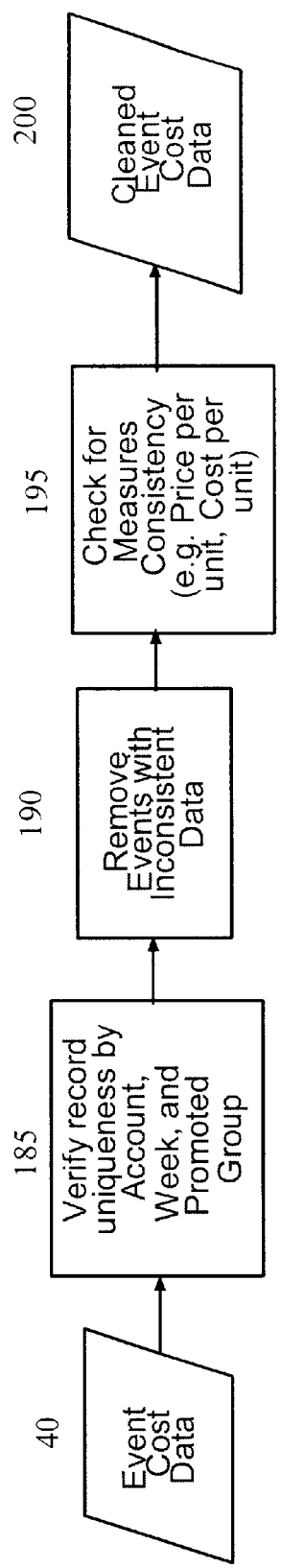
FIG. 9 is an exemplary flow diagram of event cost data cleansing and confirmation.

FIG. 9 is an exemplary flow diagram of event cost data cleansing and confirmation. Event cost cleaning and confirmation 45 occurs as follows. Event cost data 40 is checked in order to verify its uniqueness at the account, promoted group, start week and duration level at 185. Then, events with inconsistent data (i.e. overlapping events or events with missing account, promoted group, week, duration and fixed or variable cost data) are removed at 190, the consistency of measures (e.g., price per unit, COGS per unit is then checked at 195, and clean event cost data is output at 200.

The clean cost data process performs the following:

Assigns an event ID to each event

Removes events with missing data (i.e. missing account, promoted group, start week, duration and fixed or variable cost).

Removes overlapping events.

Checks the consistency of measures

Event data such as account, promoted group, duration, start week, fixed and variable cost, etc. are prerequisite to performing the clean cost data process.

The data should meet the following requirements and should be checked for uniqueness, completeness, and consistency according to the following:

Records should be unique by account, promoted group, and week.

Units (i.e., cases, pounds, etc.) should be the same as the rest of the data.

Events should be actual events, i.e., there should be a start week, a duration>=1, and % ACV>0.

The week dates should be consistent, i.e., week ending dates should be on a Sunday, and the weeks that are to be included in the analysis should be included.

Figure 10:
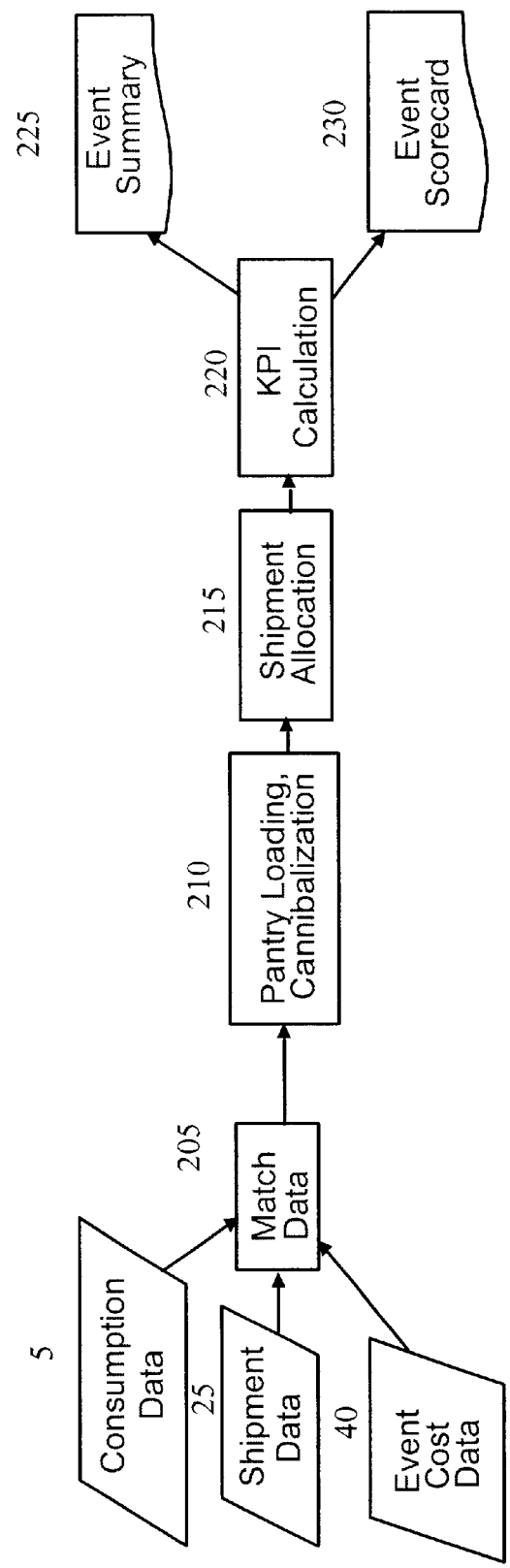
FIG. 10 is an exemplary flow diagram of bringing all processes of the present invention together.

FIG. 10 is an exemplary flow diagram bringing all processes of the present invention together. "Event Aggregation" occurs at 50, where consumption data 5, shipment data 25 and event cost data 40 are matched (205). During this process the consumption data 5, shipment data 25, and event cost data 40 are pulled into the model and matched based upon common elements such as account, promoted group, start week and duration. Once data is matched at 205, pantry loading, cannibalization and KPIs can be calculated. Event Summaries 225 and Event Scorecards 230 can be created from the data. A more detailed description is provided below.

Pantry Loading and Cannibalization Lift Adjustments

Pantry loading and cannibalization result in illusory increases in product consumption brought about by a promotional event. This increase in quantity demanded without a corresponding increase in product demand manifests itself as a temporary decrease in future consumption of the product category (pantry loading affect) and a temporary decrease in the current of substitutable products within the product category (cannibalization affect). In order to evaluate correctly the "true" impact of trade promotion on sales, a nominal lift must be adjusted for these affects. Therefore, the "True" Lift=Nominal Lift—Pantry Loading—Cannibalization.

Substitutable groups are used to determine if cannibalization or pantry loading occurred because of a promotion event. Base and actual sales are calculated by substitutable group, and then summed up to the event level. If actual sales dipped below the base sales during a week in which there was an event or events, then the cannibalized sales are noted and the sales are equally distributed among the weeks during and after the promotion events, if there was more than 1 event. If actual sales dipped below the base sales during the 2 weeks following an event or events, then the pantry loading sales are noted—again equally distributing the sales among the surrounding weeks if there was more than 1 event.

Pantry loading can be detected by monitoring the below baseline performance of product category sales during some specified period immediately following a given event. The choice of the evaluation period should be product category specific. Cannibalization can be detected by monitoring the below baseline sales performance of non-promoted products within the category of the promoted products during the event. Some issues due arise with the existence of events with back-to-back or overlapping evaluation periods that involve products in the same category.

The data should meet the following requirements and should be checked for uniqueness, completeness, and consistency:

Records should be unique by account, product, and week.

Products should have the correct associated information. Promoted group and substitutable group are required, and other information, such as category, is optional.

Accounts should have the correct associated information, such as region.

% ACV values should be consistent, i.e., either all should be expressed as a whole number or a decimal number, and should be between 0% and 100%.

% ACV for any merchandising=sum of all % ACV for promotions (except FSP (Frequent Shopper Programs).

Sales data should be included.

The week dates should be consistent, i.e., week ending dates should be on a Sunday, and the weeks that are to be included in the analysis should be included.

Any account/product combinations without any sales should be excluded from the data.

Any competitor (or division, if extracting competitor events) account/products should be excluded from the data.

Any promoted groups marked "DO NOT INCLUDE," should be excluded from the data.

Finally, a KPI calculation is performed, which does the following:

Expands the events from account, promoted group, week, duration level to account, promoted group, and week level.

Creates a final event table with the expanded events and calculated KPIs.

To accomplish this, the KPI calculation uses the following data: cleaned event cost data such as account, promoted group, duration, start week, fixed and variable cost, etc. Records that are output have a unique event ID.

Create Analysis Data

At the conclusion of the above processes, analysis data is created at 225 and 230 as follows:

An Event Base Table is created: This preliminary table is generated for the MDDB (multi-dimensional database) building process. The MDDB will then be used to create online reports.

A Score Card Table is created: This event summary table will be used to generate the Event Level Score Cards using, for example, SAS Enterprise Reporter.

A Report Table is created: This summary table will be used to generate reports using, for example, SAS Enterprise Reporter.

A Graph Table is created: This summary table will be used to generate graphs using, for example, SAS Enterprise Reporter.

Data Models

| NAME | LABEL | Description |
| --- | --- | --- |
| Consumption Data Table | | |
| ACC | Account-RMA | Account name at RMA level |
| ACVAPM | % ACV of any promo | % ACV coverage under any promo |
| ACVDP | % ACV of Display | % ACV coverage under Display |
| ACVF | % ACV of Feature | % ACV coverage under feature |
| ACVFDP | % ACV of Feat & Disp | % ACV coverage under Feature and Display |
| ACVFSP | % ACV of FSP | % ACV coverage with Frequent Shopper Program |
| ACVPR | % ACV of TPR | % ACV coverage under TPR |
| BSD | Base Dollars | total dollar sales baseline. |
| BSDSH | Base Dollar Share | Percentage, Base dollar share in the category |
| BSEQ | Base Eq. Units | total equivalized unit sales baseline |
| BSEQSH | Base Eq Unit Share | Percentage, Eq. Unit base market share in the category. |
| DINC | Dollar Increment | Incremental $ Sales under any promo, no exist in Bacon |
| DS | Dollar Sales | total dollar sales |
| DSFH | Dollar Share | Percentage, $ Share in the category |
| EQINC | Eq. Unit Increment | Incremental Equivalized Unit (Lb) volume sales under any promo |
| EQP | Eq Unit Price | average equivalized unit price in the week, including both promo & non-promo prices |
| EQPAPM | Eq Unit Price Any Promo | average equivalized unit price in the week with any promo activity |
| EQPNPM | Eq Unit Price No Promo | average equivalized unit price without any promo |
| EQS | Eq Unit Sales | total equivalized unit sales |
| EQSAPM | Eq Unit Sales Any Promo | Eq Unit Sales Disp + Eq Unit Sales Feat Disp + Eq Unit Sales Feat + Eq Unit Sales TPR |
| EQSDP | Eq. Unit Sales Disp | equivalized unit sales with display only |
| EQSF | Eq. Unit Sales Feat | equivalized unit sales with feature only |

-continued

Data Models

| NAME | LABEL | Description |
|---|---|---|
| EQSFDP | Eq. Unit Sales Feat Disp | equivalized unit sales with feature and display |
| EQSH | Eq Unit Share | Percentage, Equivalized unit share in the category |
| EQSHINC | Eq. Unit Share Increment | Incremental market share of pounds in the category |
| EQSPR | Eq. Unit Sales TPR | equivalized unit sales with TPR only |
| PCTACV | Pct ACV | The % of stores that scan the product weighted by the size of store (ACV) |
| PDI | Product Development Index | Product Development Index: (eq unit in market/population in market)/(eq unit in total US/Population in US) |
| PDNM | Product Name & Description | product name/description |
| UINC | Unit Increment | Incremental unit sales under any promo |
| UP | Unit Price | average unit price in the week, including promo & non-promo price |
| UPC | UPC | UPC of the product |
| US | Unit Sales | total unit sales, no exist in breakfast sausage |
| USH | Unit Share | Percentage, Unit share in the category |
| WK | Week Ending Date | Week ending date |
| YRACVM | Annual_ACV_2MM | Total Market (Account) size: Annual ACV volume($) for stores over 2MM revenue |

Account Data Table

| ACC | Account-RMA | Account name at RMA level |
|---|---|---|
| ACCTYPE | Account Pricing Type | Account Pricing Type |
| CUS | Customer (account w/out RMA) | Customer name of the account |
| REGION | Region | market region |

Product Data Table

| BD | Brand | Product brand |
|---|---|---|
| CAT | Category | Product category |
| DIV | Division | Division |
| PCKGSZ | Package Size | Package Size |
| PDNM | Product Name & Description | Product name/description |
| PKGUNIT | Package Size Unit | Package Size Unit |
| PROMGRP | Promoted Group | Product promotion group |
| PROMGRP1 | Original Promoted Group | Original Promoted Group |

Shipment Data Table

| COGS | COGS per Eq Unit | cost of goods sold per Eq. Unit |
|---|---|---|
| EQSHIP | Eq. Unit Ship | Number of Eq. Unit Shipments |
| LSP_RT | List Price to Retailer | Price per Eq. Unit selling to the retailer |
| PSHIP | Shipment Price per Eq. Unit | Shipment Price per Eq. Unit |
| SHIPPROD | Shipment Product Name | Shipment Product Name |
| SHIP_ACC | Shipment Account | Shipment Account |
| WK | Week Ending Date | Week ending date |

Shipment/Account-RMA Map Table

| ACC | Account-RMA | Account name at RMA level |
|---|---|---|
| SHIP_ACC | Shipment Account | Shipment Account |

Shipment/Product Map Table

| PROMGRP | Promoted Group | Product promotion group |
|---|---|---|
| SHIPPROD | Shipment Product Name | Shipment Product Name |

Time Data Table

| SEASON | Season of the Year | spring, summer, fall, winter |
|---|---|---|
| SEAYR | Year and Season | Year and Season |
| MOPOS | Month Position | the week is Beginning, or Ending of Month |
| SPDY | Special Days, such as Holiday | Holiday, back to school, etc. used for Analysis |
| WK | Week Ending Date | Week ending date |

Event Cost Data Table

| ACC | Account-RMA | Account name at RMA level |
|---|---|---|
| COMM | Comments | Commenting on discrepancies for Cost Data Cleaning |
| DUR | Duration | Length of event in # of weeks |
| EVDESC | Event Description | Event Description |
| FX_PRMC | Fixed Promotion Cost | Fixed Cost of Promotion |
| IMPEID | Imported Event ID | Imported Event ID |

Data Models

| NAME | LABEL | Description |
|---|---|---|
| PROMGRP | Promotion Group | product promotion group |
| PSTRAT | Pricing Strategy | Pricing strategy during promotion |
| SDEMO | In Store Demo? | Was a demo present in the store (y or n)? |
| SWK | Start Week | Week of Event Beginning |
| VAR_PR | Variable | Variable Cost of Promotion |
| MC | Promotion Cost | |
| Competitor Market Data Table | | |
| ACC | Account-RMA | Account name at RMA level |
| COMP_MKT | Competitive Market | Dominant Competitor in the market |
| PROMGRP | Promoted Group | product promotion group |
| Media Activity Data Table | | |
| ACC | Account-RMA | Account name at RMA level |
| MEDIAT | Media Activity | Any major media campaign going on |
| PROMGRP | Promoted Group | product promotion group |
| WK | Week Ending Date | Week ending date |
| Consumer Activity Data Table | | |
| ACC | Account-RMA | Account name at RMA level |
| CSAT | Consumer Activity | Any major consumer promo activity going |
| PROMGRP | Promoted Group | product promotion group |
| WK | Week Ending Date | Week ending date |
| Substitutable Group Data Table | | |
| PROMGRP | Promoted Group | product promotion group |
| REGION | Region | market region |
| SUBGRP | Substitutable Group | All products in the same group are considered as substitutable. This information will be used in pantry load, cannibalization adjustment. |
| Competitive Activity Data Table | | |
| ACC | Account-RMA | Account name at RMA level |
| ACVAPM | % ACV of any promo | % ACV coverage under any promo |
| ACVDP | % ACV of Display | % ACV coverage under Display |
| ACVF | % ACV of Feature | % ACV coverage under feature |
| ACVFDP | % ACV of Feat & Disp | % ACV coverage under Feature and Display |
| ACVFSP | % ACV of FSP | % ACV coverage with Frequent Shopper Program |
| ACVPR | % ACV of TPR | % ACV coverage under TPR |
| CAT | Category | Product category |
| EQS | Eq Unit Sales | total equivalized unit sales |
| WK | Week Ending Date | Week ending date |

Key Performance Indicators (KPIs) for Post-Event Analysis

Core Measures

| Measure | Description | Formula |
|---|---|---|
| Spending Efficiency | Reflects profit as a % of spending | $\frac{(\text{Nom Incr Cons} \times \text{Contr/Unit}) - (\text{Cann Cons} \times \text{Cannibalized Contr/Unit})}{\text{Total Event Spending}}$ |
| % Lift | Overall % increase in sales from the promotion | $\frac{\text{"True" Incremental Consumption}}{\text{Baseline Consumption}}$ |
| Incremental Revenue | Incremental revenue generated during the promotion period | [(Total Cons. × Negotiated List Price/Unit) − (Cann Units × Cann List Price/Unit)] − (Base Cons. × Everyday List Price/Unit) |
| Incremental Profit | Incremental profit generated during the promotion period | [("Nominal" Incr Cons × Contr/Unit) − (Cannibalized Cons × Cannibalized Contr/Unit)] − Tot Event Spending |

Supporting Measures

| Measure | Description | Formula |
|---|---|---|
| Cost per Incremental Unit | Cost of each incremental unit sold during a promotional event | $\frac{\text{Total Event Spending}}{\text{"True" Incremental Consumption}}$ |

-continued

| | | |
|---|---|---|
| Profit per Incremental Unit | Profit generated by each incremental unit during an event | $$\frac{\text{Incremental Profit}}{\text{"True" Incremental Consumption}}$$ |
| Weighted Weeks of Support | Number of weeks of support (e.g., feature, display, TPR) provided by the average store | # of Weeks Duration × % ACV Any Merchandising |
| Pass-Through | Percentage of promotion dollars given to account which is passed through as a lower consumer price | $$\frac{\text{(Baseline Price - Avg. Promoted Price)} \times \text{Total Cons.}}{\text{Total Event Spending}}$$ |
| Retailer Margin | Margin made by the account during the deal | $$\frac{\text{Average Promoted Price - Negotiated List Price}}{\text{Average Promoted Price}}$$ |
| Total Revenue | Total revenue generated during the promotion period | Total Consumption × Negotiated List Price/Unit |
| Total Profit | Total profit generated during the promotion period | (Total Consumption × Contribution/Unit) − Total Event Spending |
| Dollar Market Share | Average dollar market share during the promotion period | $$\frac{\text{Sum of Weekly Share for Promotion Period}}{\text{# of Weeks Duration}}$$ |
| Forward Buy | % of shipments that are not consumed (i.e., forward bought) during the period | $$\frac{\text{(Total Shipments - Total Consumption)}}{\text{Total Shipments}}$$ |
| Forward Buy Cost | Lost revenue due to forward buy activity | (Total Shipments − Total Consumption) × Variable Cost per Unit) |

Although the present invention has been described in detail, it is clearly understood that the same is by way of illustration and example only and is not to be taken by way of limitation.

What is claimed is:

1. A computer-based method of processing data from disparate data sources into a combined data file for use in a system for conducting data processing for trade promotion event effectiveness analysis, the method comprising the acts of:
   inputting into a computer consumption data, shipment data and event cost data, wherein the consumption data is extracted from a database provided by one or more syndicated consumer data reporting agency, the shipment data is provided by a user's internal systems, and the event cost data is provided by the user's organization;
   transforming by said computer consumption data by checking and verifying the consumption data for uniqueness and consistency from one time period to another, computing and adding to the inputted consumption data, baseline consumption data for each event time period and identifying time periods and related consumption data associated with a trade promotion event,
   aggregating by said computer the consumption data, shipment data and event cost data into a single data file; and
   using the single data file to analyze effectiveness of trade promotional events.

2. The method of claim 1, further comprising:
   verifying account and product hierarchies in the consumption data to ensure unique account identifiers and product identity and characteristics, respectively; and
   recording the consumption data such that for the account a UPC exists for an observation, and such that observation characteristics are recorded uniformly.

3. The method of claim 2, further comprising:
   rolling the consumption data into a sales summary report for viewing by a user.

4. The method of claim 3, wherein the sales summary report includes aggregated sales by account, by products and by account/product combinations.

5. The method of claim 1, further comprising:
   mapping the shipment data in order to match shipment accounts to consumption data, and to match shipment SKUs to promoted groups; and
   checking the shipment data to verify account, promoted group and week-level uniqueness.

6. The method of claim 1, further comprising:
   verifying the uniqueness of a account, promoted group, start and a week and duration-level of the event cost data; and
   removing events with inconsistent information.

7. The method of claim 1 wherein the syndicated consumer data reporting agency is Information Resources, Inc.™ (IRI).

8. The method of claim 1 wherein the syndicated consumer data reporting agency is AC Nielsen™.

9. The method of claim 1 comprising the additional acts of
   calculating at least one of key performance indicators (KPIs) for post-event analysis using the data in the single data file; and
   providing reports of the KPIs for products related to selected promotional events.

10. The method of claim 9 wherein the KPIs include data representing core measures which comprise at least one of spending efficiency, percent lift, incremental revenue and incremental profit.

11. The method of claim 10 wherein the KPIs further include data representing supporting measures which comprise at least one of the following: cost per incremental unit, profit per incremental unit, weighted weeks of support, pass-through promotion dollars, retailer margin, total revenue, total profit, dollar market share, forward buy activity, forward buy cost, and any relevant measure requested by the user.

12. The method of claim 11 wherein the KPIs for products related to selected promotional events are compared to planned data for corresponding products and related promotional events to evaluate actual performance and to construct revised plans for future promotional events.

13. The method of claim 12 wherein the planned data is benchmark KPI data comprising at least one of data representing all events, and data representing a selected group of events.

14. The method of claim 1 wherein the consumption data is obtained directly from retail sales units in lieu of being obtained from a syndicated consumer data reporting agency.

15. A computer-based method of aggregating data to create a computer data file for trade promotion event effectiveness analysis, the method comprising the acts of:

inputting into a computer consumption data, shipment data and event cost data into files in the computer, wherein the consumption data is provided by one or more syndicated consumer data reporting agency, the shipment data is provided by a user's internal systems, and the event cost data is provided by the user's organization;

matching using said computer consumer account identification data in the consumption file with shipment account identification data in the shipment file and matching standard product identification data in the shipment file to product identification data in the consumption file;

outputting a consolidated historical trade promotion event data file based on matched data records in each of the consumption, shipment and event cost data files; and using the consolidated historical trade promotion event data file to analyze effectiveness of trade promotional events;

whereby the consolidated historical trade promotion event data file is more efficient and more correct than raw data files for performing event in said computer analysis.

16. The method of claim 15, further comprising the acts of:

using the consumption data file to compute for each event week during a promotion event, a corresponding consumption data element designated a baseline consumption data element which represents base non-promoted consumption data and using the baseline consumption data elements to compute baseline consumption data elements for all time periods;

monitoring below baseline sales performance of data for promoted product category sales during a specified period following an event, by comparing the promoted product category sales data for each time period with a corresponding baseline consumption data element for a corresponding time period, whereby pantry loading can be detected;

monitoring below baseline sales performance of non-promoted products during the promoted product event, by comparing sales of the non-promoted products for each relevant time period with a corresponding baseline consumption data element for a corresponding time period, whereby Cannibalization can be detected; and adjusting consumption data for sales in relevant periods to compensate for pantry loading and Cannibalization in the relevant periods whereby a more correct impact of trade promotion on sales for the relevant periods can be determined.

17. The method of claim 16 comprising the additional acts of calculating key performance indicators (KPIs) for post-event analysis using the data in the consolidated historical trade promotion event data file; and providing reports of the KPIs for products related to selected promotional events.

18. The method of claim 17 wherein the KPIs include data representing core measures which comprise spending efficiency, percent lift, incremental revenue and incremental profit.

19. The method of claim 18 wherein the KPIs further include data representing supporting measures which comprise at least one of the following: cost per incremental unit, profit per incremental unit, weighted weeks of support, pass-through promotion dollars, retailer margin, total revenue, total profit, dollar market share, forward buy activity, forward buy cost, and any relevant measure requested by the user.

20. The method of claim 19 wherein the KPIs for products related to selected promotional events are compared to planned data for corresponding products and related promotional events to evaluate actual performance and to construct revised plans for future promotional events.

21. The method of claim 20 wherein the planned data is benchmark KPI data comprising at least one of data representing all events, and data representing a selected group of events.

22. The method of claim 15 wherein the syndicated consumer data reporting agency is Information Resources, Inc.™ (IRI).

23. The method of claim 15 wherein the syndicated consumer data reporting agency is AC Nielsen™.

24. The method of claim 15 wherein the consumption data is obtained directly from retail sales units in lieu of being obtained from a syndicated consumer data reporting agency.

25. A system for processing data from disparate data sources into a combined data file for use in a system for trade promotion event effectiveness analysis, comprising:

a database collecting consumption data, shipment data and event cost data wherein the consumption data is provided by one or more syndicated consumer data reporting agency, the shipment data is provided by a user's internal systems, and the event cost data is provided by the user's organization; and a processor transforming the consumption data by checking and verifying the consumption data for uniqueness and consistency from one time period to another, computing and adding to the inputted consumption data baseline consumption data for each event time period and identifying time periods and related consumption data associated with a trade promotion event, and aggregating the transformed consumption data, shipment data and event cost data into a single data file, and using the single data file to analyze effectiveness of trade promotional events.

26. The system of claim 25 wherein the syndicated consumer data reporting agency is Information Resources, Inc.™ (IRI).

27. The system of claim 25 wherein the syndicated consumer data reporting agency is AC Nielsen™.

28. The system of claim 25 wherein the consumption data is obtained directly from retail sales units in lieu of being obtained from a syndicated consumer data reporting agency.

29. A system for aggregating data from disparate data sources to create a data file for efficient analysis of trade promotion event effectiveness, comprising:

a database storing consumption data, shipment data and event cost data wherein the consumption data is provided by one or more syndicated consumer data reporting agency, the shipment data is provided by a user's internal systems, and the event cost data is provided by the user's sales organization; and a processor matching consumer account identification data in the consumption data with shipment account identification data in the shipment data and matching standard product identification data in the shipment data to product identification data in the consumption data and matching trade promotion data in the event cost data to related time periods in the consumption data, and outputting a consolidated historical trade promotion event data file based on matched data records in each of the consumption, shipment and event cost data, and using the consolidated historical trade promotion event data file to analyze effectiveness of trade promotional events;

whereby the consolidated historical trade promotion event data file is more efficient and more correct than raw data files for performing event based analysis.

30. The system of claim 29 wherein the syndicated consumer data reporting agency is Information Resources, Inc.™ (IRI).

31. The system of claim 29 wherein the syndicated consumer data reporting agency is AC Nielsen™.

32. The system of claim 29 comprising the additional acts of calculating key performance indicators (KPIs) for post-event analysis using the data in the consolidated historical trade promotion event data file; and providing reports of the KPIs for products related to selected promotional events.

33. The system of claim 32 wherein the KPIs include data representing core measures which comprise spending efficiency, percent lift, incremental revenue and incremental profit.

34. The system of claim 33 wherein the KPIs further include data representing supporting measures which comprise at least one of the following: cost per incremental unit, profit per incremental unit, weighted weeks of support, pass-through promotion dollars, retailer margin, total revenue, total profit, dollar market share, forward buy activity, forward buy cost, and any relevant measure requested by the user.

35. The system of claim 34 wherein the KPIs for products related to selected promotional events are compared to planned data for corresponding products and related promotional events to evaluate actual performance and to construct revised plans for future promotional events.

36. The system of claim 35 wherein the planned data is benchmark KPI data comprising at least one of data representing all events, and data representing a selected group of events.

37. The system of claim 29 herein the consumption data is obtained directly from retail sales units in lieu of being obtained from a syndicated consumer data reporting agency.

* * * * *